Oct. 11, 1938.  H. L. POPE ET AL  2,132,540
BROACHING MACHINE
Filed July 16, 1937  2 Sheets-Sheet 1
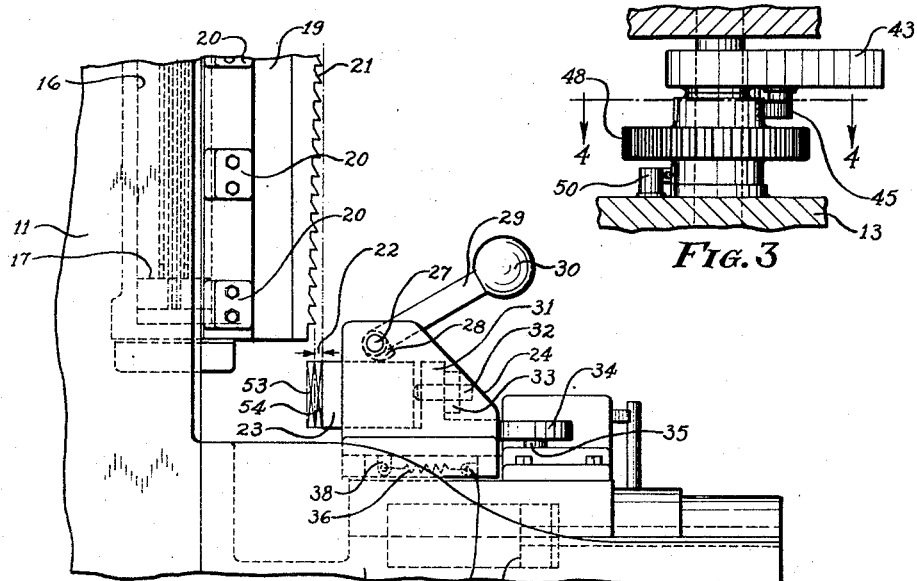
Fig. 1
Fig. 3
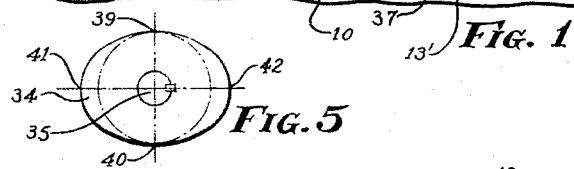
Fig. 5
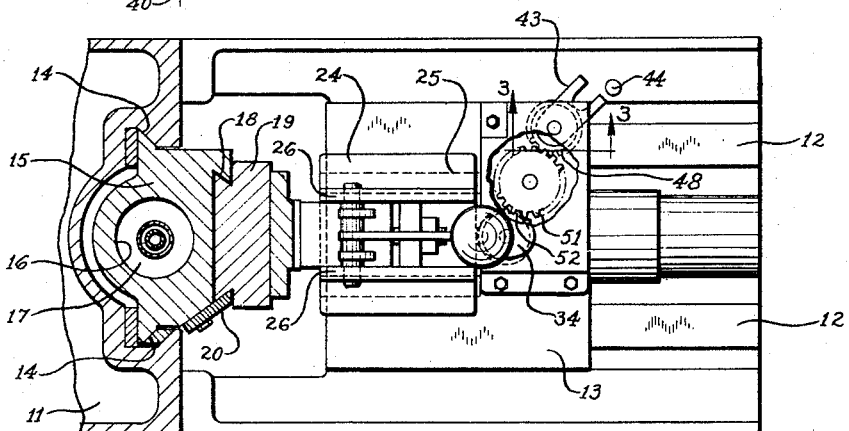
Fig. 2
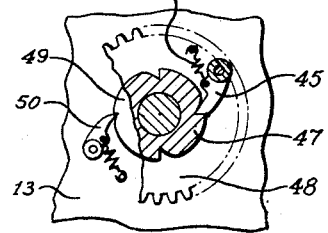
Fig. 4
INVENTORS
HOWARD L. POPE - GEORGE R. SQUIBB
BY
A. K. Parsons
ATTORNEY.

Patented Oct. 11, 1938

2,132,540

UNITED STATES PATENT OFFICE 2,132,540

BROACHING MACHINE

Howard L. Pope and George R. Squibb, Cincinnati, Ohio, assignors to The Cincinnati, Milling Machine Company, Cincinnati, Ohio, a corporation of Ohio Application July 16, 1937, Serial No. 154,034

6 Claims. (Cl. 90—33)

This invention relates to broaching machines and more particularly to improvements in the work supports thereof.

It is a well known fact that the amount of material to be removed from a work piece by a broaching operation is an important factor in the design of the broaching tool because it determines the size, number of teeth, and the length of the broaching tool. It also determines the proportion between the number of roughing teeth and the number of finishing teeth to be provided on the tool. It will therefore be apparent that, if a tool, which is designed to remove for instance a quarter of an inch of material, has presented to it a rough casting which has more than a quarter of an inch of excess stock to be removed, a new tool must be provided having a greater capacity if the excess material is to be safely removed.

This invention deals with the problem of how to remove material from a work piece which is in excess of the material removal capacity of the broaching tool.

One of the objects of this invention is to increase the metal removal capacity of a broaching tool as respects a given work piece.

Another object of this invention is to provide improved means for supporting a work piece in relation to a broaching tool whereby successive passes of a broaching tool may be made with respect to a single work piece without disturbing the position of the work piece in its holder.

A further object of this invention is to provide improved means for successively indexing a work piece with respect to a broaching tool whereby successive portions of the work piece may be removed by successive strokes of the tool.

An additional object of this invention is to provide improved control mechanism whereby a single cycle broaching machine may be caused to execute a plurality of cycles in automatic succession before stopping.

Other objects and advantages of the present invention should be readily apparent by reference to the following specification considered in conjunction with the accompanying drawings illustrative of one embodiment thereof, but it will be understood that any modifications may be made in the specific structural details within the scope of the appended claims without departing from or exceeding the spirit of the invention.

Referring to the drawings in which like reference numerals indicate like or similar parts:

Figure 1 is a side view showing a portion of a broaching machine.

Figure 2 is a plan view of the parts shown in Figure 1.

Figure 3 is an enlarged section taken on the line 3—3 of Figure 2.

Figure 4 is a detail section taken on the line 4—4 of Figure 3.

Figure 5 is a detail view of the control cam.

Figure 6:
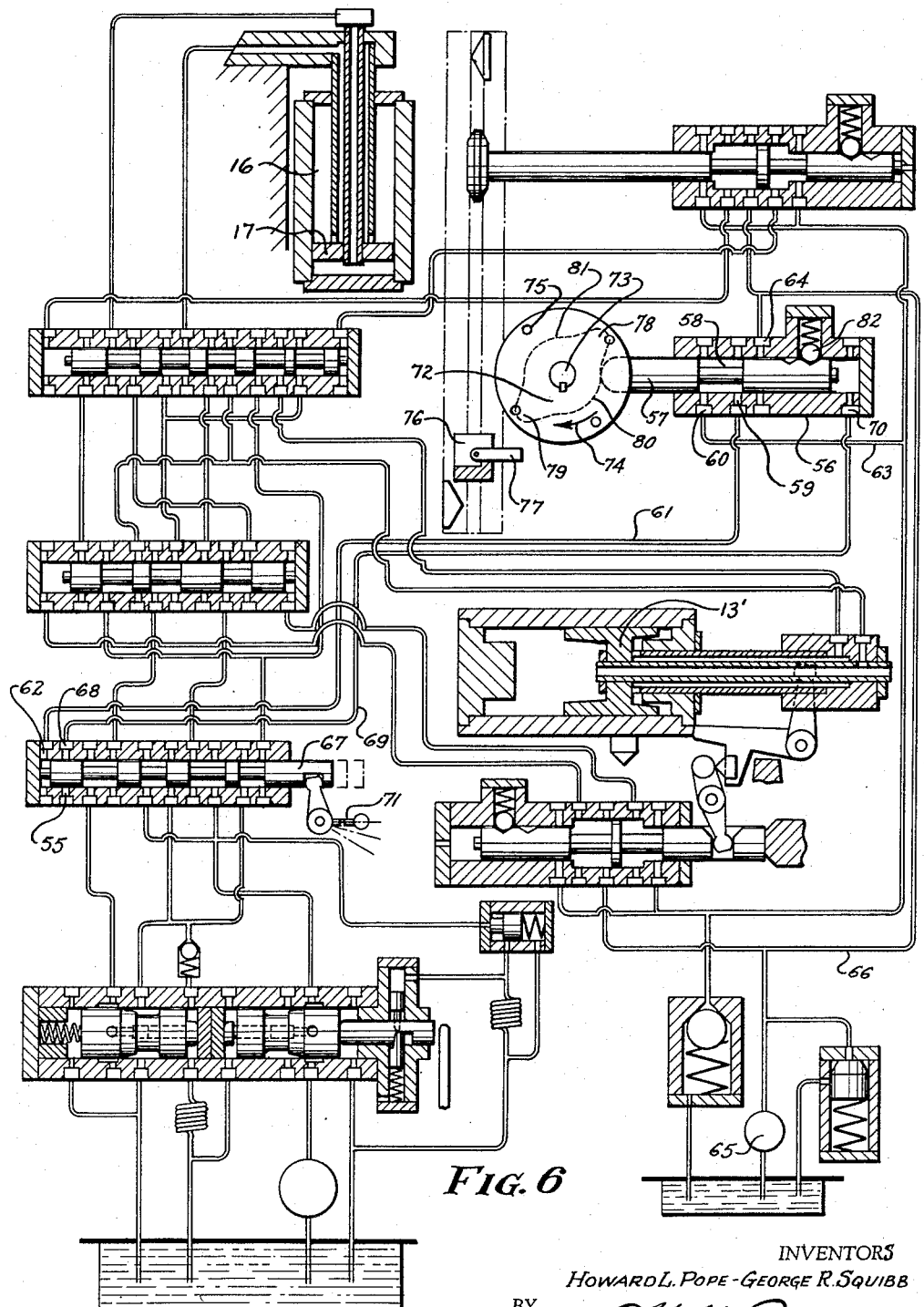
Figure 6 is a diagrammatic view of an hydraulic control circuit for the machine showing the improved cycle control mechanism.

Referring to the drawings, and more particularly to Figures 1 and 2, the reference numeral 10 indicates a portion of the bed of a broaching machine having an uprising column 11 formed integral therewith. The bed 10 has guideways 12 formed thereon for receiving a reciprocable slide 13 actuable by the piston and cylinder combination 13'. The column 11 has dovetailed guideways 14 in which a broaching ram 15 is mounted for vertical movement. The broaching ram has a cylinder 16 integrally formed therewith in which fits a fixed piston 17 whereby the ram may be power reciprocated.

The ram 15 is provided with a dovetailed guideway 18 in which may be clamped a broaching tool 19 by means of a plurality of clamping members 20. The broaching tool 19 is provided with a series of cutting teeth 21, the plane of which is inclined to the plane of the vertical guideways 14, whereby during downward movement of the ram, the teeth will progressively remove material from the work piece. The total amount of material that can be removed by a given broaching tool will obviously depend upon the angle of inclination of the plane of the teeth and the length of the tool. For explanatory purposes, the amount of material that can be removed by the tool 19 has been arbitrarily determined and is indicated by the reference numeral 22. This amount is the total depth of cut and may be considered as the metal removing capacity of the tool.

If a work piece, such as 23, has excess stock thereon in an amount greater than the removal capacity of the tool, it will be obvious that the same cannot be removed in a single feeding stroke between the tool and the work. This invention deals with a mechanism for successively positioning the work with respect to the tool whereby the desired amount of material may be removed in more than one stroke of the tool, and without disturbing the position or clamping of the work in the work holder. To this end a work holder 24 is slidably mounted on guideways 25 formed on the top of the reciprocable slide 13. The work holder 24 may be provided with suitable means for clamping a work piece dependent upon its shape and size, and for illustrative purposes, it is shown in the drawings as provided with a rectangular cavity suitable in size and shape to receive the rectangular shaped work piece 23. The side walls 26 of the work holder support a shaft 27, upon which is formed suitable cam portions 28 for engaging and clamping the work piece solidly in the holder. The shaft 27 may be provided with an operating lever 29 to the end of which is attached a weight 30, the weight serving to assist in the clamping action and serving to prevent the parts from loosening during the cutting operation.

The work holder is provided with a rear wall 31 in which is mounted an adjustable stop screw 32 having a lock nut 33. This screw serves to locate the work in the fixture and determine the position of the final surface to be produced on the work by the broaching operation.

The slide 13 is provided with a cam 34 which is supported for rotation on a shaft 35 journaled in the slide. A spring 36 has one end 37 attached to the slide 13, and the other end 38 attached to the work holder 24, whereby the work holder is continuously urged into contact with the periphery of the cam 34. The cam 34 is indexed through an angle of 90° upon each reciprocation of the slide 13. It is therefore provided with two low points 39 and 40 and two high points 41 and 42, so that by successive indexing, the work holder will be alternately advanced and retracted relative to the supporting slide 13.

A Geneva mechanism has been provided for indexing the cam, and comprises a lever 43 having a bifurcated end for engaging a pin 44 integral with the bed 10. The lever 43 carries a pawl 45, which is held by a spring 46, into engagement with a ratchet wheel 47 formed integral with the hub of a gear 48. During movement of the slide 13 toward the broaching tool, the lever 43 is caused to rotate in a clockwise direction by pin 44 and thereby rotates the gear 48 in the same direction. The gear has a second ratchet wheel 49 formed on the under side thereof which is engageable by a stop pawl 50 pivotally mounted on the slide 13, and this pawl serves to hold the gear in a given position during return movement of the ratchet pawl in a counter-clockwise direction during outward movement of the slide 13.

The gear 48 intermeshes with an idler gear 51 which in turn intermeshes with a gear 52 keyed to the shaft 35 which carries the cam 34. It will now be apparent that if the lever 43 is rotated through an angle of 90°, that the cam 34 will be indexed through an angle of 90° each time the slide 13 is reciprocated. This means that the work holder will be advanced and retracted relative to the slide 13 by an amount equal to the difference between the radius of a low point on the cam, such as 39, and the radius of a high point on the cam, such as 41. If this difference, which is the effective rise on the cam, is made substantially equal to the metal removing capacity of the tool, as indicated by reference numeral 22, it will be apparent that when the work holder 24 is in a retracted position, the work may be so positioned therein by the adjustable stop screw 32 that a first portion or layer of material, such as indicated by the reference numeral 53 may be removed on the first downward stroke of the tool, and upon subsequent retraction of the slide 13 to clear the tool and permit the same to return, the index mechanism will complete its ratcheting stroke so that upon the next return of the slide 13, the cam 34 will be rotated to advance the work holder relative to the slide 13 and thereby place the work in such a position that a second layer of material, such as that indicated by the reference numeral 54, may be removed during the next downward stroke of the tool.

Thus after the work has been once positioned in the work holder, the desired amount of material may be removed from the work piece without changing its position in the work holder and even although the desired amount of material to be removed is in excess of the capacity of the tool.

It will be obvious that the cam may be removed, and other cams substituted having lobes of different dimensions for varying the amount of material removed on the second stroke; or arranged in different succession to obtain a plurality of indexes or advances.

An hydraulic control circuit for effecting an automatic cycle of operation of the machine is shown in Figure 6 of the drawings, but since this circuit, with the exception of changes set forth hereinafter, is the same as that shown in co-pending application, Serial No. 144,192, filed May 22, 1937, detailed description thereof is not believed to be necessary.

It is sufficient to point out that this circuit has a stop valve 55 therein which, when in an extreme right hand position, stops the operation of the machine and when in an extreme left hand position, causes operation of the machine. Since the present machine is designed to execute two or more cycles before stopping, trip control means have been provided whereby this stop valve will not be shifted to its stop position until the necessary number of cycles have been executed. A pilot control circuit is provided for shifting the stop valve from a running position to its stop position, and comprises a pilot valve 56 having a plunger 57 in which is formed an annular groove 58 which normally is in such a position that it interconnects ports 59 and 60. The port 59 is connected by a channel 61 to port 62 located in the left hand end of the stop valve 55. The port 60 is connected by a channel 63 to the reservoir of the machine.

The pilot valve has a pressure port 64 which is supplied with fluid under pressure from a pump 65 through channel 66. When the plunger 57 is shifted to the right, it interconnects pressure port 64 with port 59 whereby fluid will flow to the left hand end of the stop valve and shift the plunger 67 thereof to its extreme right or stop position. When the plunger 67 has completed its movement, it interconnects port 62 with port 68 whereby the fluid pressure will continue to flow through channel 69 to port 70 located in the right hand end of the pilot valve housing 56, thereby shifting the plunger 57 back to its normal position and disconnecting pressure port 64 from port 59 whereby the left hand end of the stop valve is connected to reservoir and the valve is free to be moved again to a running position by the operator throwing the manual control lever 71 in a counter-clockwise direction.

As previously stated, it is desirable that the broaching ram execute two or more strokes before the stop valve is thrown, and to this end a control cam 72 is pivotally mounted on a shaft 73 adjacent the side of the ram and this shaft has a plate 74 keyed therewith which is provided with a plurality of projecting pins 75. A latch dog 76 is provided on the ram having a lever 77 which is effective on the up stroke of the ram and ineffective on the downward stroke.

The cam is provided with two lobes 78 and 79 located diametrically opposite to one another and of sufficient radial dimension to shift the pilot valve plunger. Intermediate these lobes are dwell portions 80 and 81. For illustrative purposes the cam is provided with two lobes and the plate provided with four pins, and upon each upward stroke of the broaching ram, the cam and plate are indexed 90°. Since the plate and cam are unidirectionally rotated in a clockwise direction, it will be apparent that upon the first upward stroke as shown, the pilot valve plunger will not be shifted. This means that the pilot valve plunger is only shifted on every other stroke of the broaching ram whereby the machine can execute two cycles in automatic succession before the machine is stopped. A spring pressed detent 82 is provided for holding the plunger 57 in either one of its positions and it will be noted that the cam is so positioned that during rotation through an angle of 90° it will shift the pilot valve plunger to the right after a movement of substantially 45°, and the next 45° will move the cam around so that a dwell portion is opposite the plunger 57 which thereby makes it possible for the hydraulic pressure entering port 70 to reposition the plunger 57 without interference.

It will be obvious that a cam may be provided which has an additional number of lobes and additional pins provided in the plate whereby more than two cycles of operation can be effected before the machine is stopped.

A broaching machine has thus been provided which is equipped with the necessary mechanism whereby a plurality of broaching cuts may be effected on a single work piece in automatic succession, thereby increasing the material removing capacity of the machine as respects a single work piece.

What is claimed is:

1. In a broaching machine having a reciprocating broaching tool and a slide reciprocable toward and from said tool, a work holder slidably mounted on said slide for movement in a direction parallel thereto, a rotatable cam carried by the slide, resiliently operable means for holding the work holder in contact with said cam, said cam having alternate low and high points thereon, and means to automatically index the cam with each reciprocation of said slide.

2. In a machine of the character described, the combination with a bed or support, of a cutter ram reciprocably mounted thereon, a main work support slidably mounted on the bed and movable in a direction toward and from the path of movement of the ram, means to effect definite alternate strokes of the ram and work support, a work clamping fixture mounted on said work support for movement therewith and relative thereto, a cutter on the ram, means to rigidly hold the work in opposition to the cutter when in advanced position, means to incrementally advance the work with respect to its support intermediate operative strokes of the ram, and means to stop the movement of the ram and work support after a succession of said incremental movements.

3. In a machine of the character described, the combination with a bed, of a cutter ram reciprocably mounted thereon, a work support mounted on the bed for movement in a path intersecting the path of movement of the ram, hydraulically operable means for effecting alternate reciprocating movements of the ram and work support in their respective paths, a first intermittently actuable cam, means operable by reciprocation of the work for actuating said cam to control incremental advances of the work, a second timing cam, means operable by reciprocations of the ram for imparting a step by step movement to said cam, and means operable by the cam for discontinuing the hydraulic actuation of the ram and work support.

4. In a machine of the character described, the combination with a bed, of a cutter ram reciprocably mounted thereon, a work support mounted on the bed for movement in a path intersecting the path of movement of the ram, hydraulically operable means for effecting alternate reciprocating movements of the ram and work support in their respective paths, a first intermittently actuable cam, means operable by reciprocation of the work for actuating said cam to control incremental advances of the work, a second timing cam, means operable by reciprocations of the ram for imparting a step by step movement to said cam, and means operable by the cam for discontinuing the hydraulic actuation of the ram and work support, said means including a stop valve having an actuating portion projecting into the path of movement of the operative surface of the cam.

5. In a machine of the character described, the combination with a bed, of a cutter ram reciprocable thereon, a hydraulic motor mechanism for effecting reciprocations of the ram, an actuating circuit for said motor including a stop valve, a control cam supported by the bed adjacent the ram, ram operated means for effecting uni-directional step by step rotation of the control cam, and connections between the cam and stop valve for actuating the latter upon predetermined positioning of the cam, whereby actuation of the hydraulic motor will be automatically discontinued upon completion of a series of reciprocations of the ram.

6. In a machine of the character described, the combination with a bed or support, of a cutter ram reciprocably mounted on the bed, a work support reciprocably mounted on the bed for movement in a direction toward and from the path of reciprocation to the cutter ram, power means for effecting alternate reciprocations of said ram and support, work holding means on the work support, a first control cam for effecting incremental advances of the work holding means with respect to the reciprocating support, a second control cam for discontinuing power actuation of the ram and support, and means actuated by movement of said last two-named parts for effecting alternate movements of said cams in predetermined sequences.

HOWARD L. POPE.
GEORGE R. SQUIBB.